United States Patent

Sherman

[11] 3,747,395
[45] July 24, 1973

[54] MASTER FOR MONITORING FLUID FLOW TYPE SURFACE ROUGHNESS GAGES

[75] Inventor: Charles R. Sherman, Xenia, Ohio

[73] Assignee: The Bendix Corporation, Southfield, Mich.

[22] Filed: Dec. 10, 1972

[21] Appl. No.: 206,038

[52] U.S. Cl. ............................. 73/1 R, 73/4, 73/37, 73/105
[51] Int. Cl. .............................................. G01l 27/00
[58] Field of Search ........................ 73/105, 37, 1, 4

[56] References Cited
UNITED STATES PATENTS

| | | | |
|---|---|---|---|
| 2,479,606 | 8/1949 | Douglass | 73/105 X |
| 2,618,965 | 11/1952 | Gray | 73/105 X |
| 2,963,900 | 12/1960 | Kuebler | 73/105 X |
| 3,379,050 | 4/1968 | Parker | 73/105 |
| 2,715,830 | 8/1955 | Lewis et al. | 73/1 R |
| 3,505,861 | 4/1970 | Schoefer et al. | 73/1 R |

Primary Examiner—Richard C. Queisser
Assistant Examiner—Arthur E. Korkosz
Attorney—John R. Benefiel et al.

[57] ABSTRACT

A block-type master is described which has formed on the surface thereof a series of straight line grooves, and which in carrying out the monitoring method is placed so that the groove series extends traversely to and contained entirely within the annular flow groove in the smoothness measuring reading head. The depth of the grooves is carefully controlled to create The flow precisely corresponding to that of a given roughness standard to thus provide a ready check on the accuracy of the instrument and also a convenient indicator of the cause of the instrument inaccuracy. The configuration of the flow grooves in the master allow for precise uniformity of groove depth in manufacture thereof, while this factor and the transverse placement of the flow grooves create relative insensitivity to alignment of the master and reading head, thus allowing rapid and highly accurate and repeatable monitoring checks of operating instruments.

4 Claims, 4 Drawing Figures

PATENTED JUL 24 1973

MASTER FOR MONITORING FLUID FLOW TYPE SURFACE ROUGHNESS GAGES

BACKGROUND OF THE INVENTION

1. Field of the Invention

This invention concerns a method of monitoring pneumatic type surface roughness gages and also masters for use in such monitoring methods.

2. Description of the Prior Art

Pneumatic type gages which measure the roughness of surfaces of articles such as sheets of paper have long been known and commercially available. In these devices, a reading head is usually provided which has an annular groove therein supplied with a fluid (usually air) under accurately regulated pressure. In use, the reading head is placed on the surface of the sheet and flow over annular lands defining the annular groove is a measure of the roughness of the surface.

This flow is typically measured by very accurate column type air flow gages, usually by clusters of three such instruments to measure flows corresponding to rough, medium, and fine textures. These gages are designed such that the range of flows measured by each of these is consecutive, i.e., the low flow calibration point of the highest flow gage (corresponding to rough surfaces) is the same as the high flow calibration of the medium flow gage (corresponding to the medium rough surfaces) and likewise the low flow calibration point of the medium flow gage is the high flow calibration of the low flow gage (corresponding to the least rough surface).

In use, the instruments are claibrated by diverting flow through each of a series of calibrating orifices in each instrument and corresponding master orifices on the reading head assembly instead of through the reading head, with flow through a single master and calibrating orifice used to calibrate the amplification and float level of each column air gage to its high flow calibration point, and flow through the calibrating orifice alone used to set the low point.

This is the only check heretofore available on the accuracy of the readings during actual gaging operations, and this method has at least four disadvantages: (a) It does not allow for quick monitoring of the accuracy of the readings, as the calibration procedure, while not extremely difficult does consume a significant amount of time. (b) Since flow is diverted from the reading head during this calibration procedure, a perfectly accurate calibration can still result in erroneous readings due to reading head flows such as nicks, or wear of the reading head lands. Hence, errors can go undetected for relatively long periods of time, during which huge runs of paper production can be lost. (c) If erroneous readings are detected by other means the operator is not able to determine if such errors are due to wear or dirt in the master or internal calibrating orifices or in the reading head, etc. (d) It does not allow convenient cross checking of the high flow point with the low flow point between instruments due to the configuration of the calibration circuit.

These difficulties have heretofore not been able to be circumvented due to the unavailability of a flow master capable of giving the extremely accurate readings necessary with a high degree of repeatability without time consuming monitoring set ups, or excessive manufacturing costs, as previous attempts have required extremely accurate positioning of the master block with respect to the reading head, and further have been very difficult to manufacture with the accuracy required.

Therefore, it is an object of the present invention to provide a master and a method utilizing such a master for monitoring the readings of such instruments which can quickly and very accurately check the readings thereof, and when used together with the calibration procedure will insure accurate readings.

It is a further object to provide such a master which can be manufactured for a reasonable cost yet provide the extreme accuracy required.

SUMMARY OF THE INVENTION

These and other objects which will become apparent upon a reading of the following specification and claims is accomplished by a block master having a series of straight grooves formed across its upper surface. This series of grooves is of a width such that they are completely contained within annular flow chamber, when, in use of the master of the present invention, the master is placed under the reading head with the grooves extending transversely to the flow chamber, so that changes in relative position between the reading head and master within limits do not affect even slightly the flow readings.

DETAILED DESCRITPION

In the following detailed description, specific embodiments will be described and certain terminology will be utilized for the sake of clarity, but it is to be understood that these are merely illustrative and the invention may be practiced in a variety of forms and embodiments.

Figure 1:
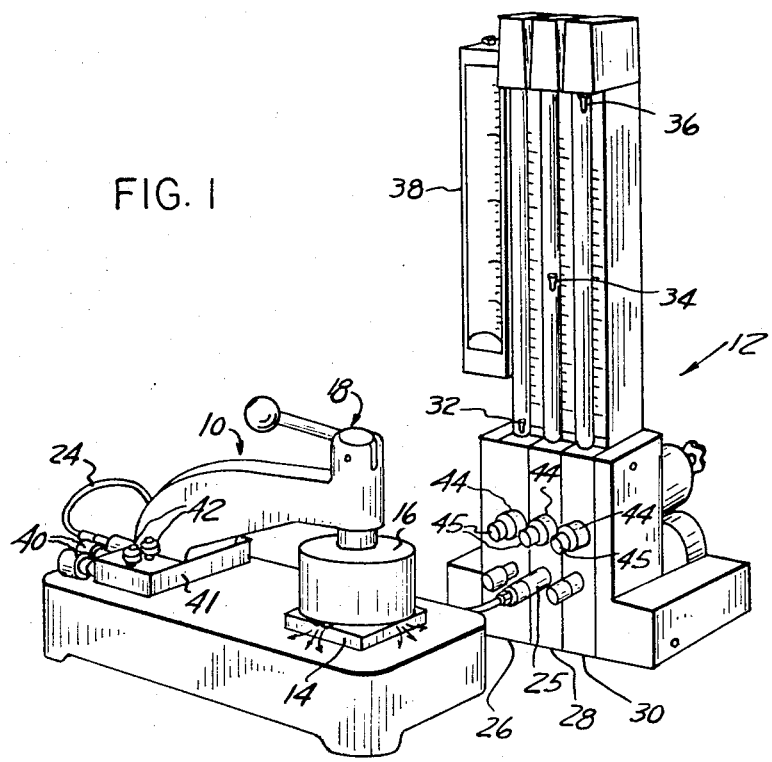
FIG. 1 is a perspective view of the test set up with a master placed in position under the reading head.
Figure 2:
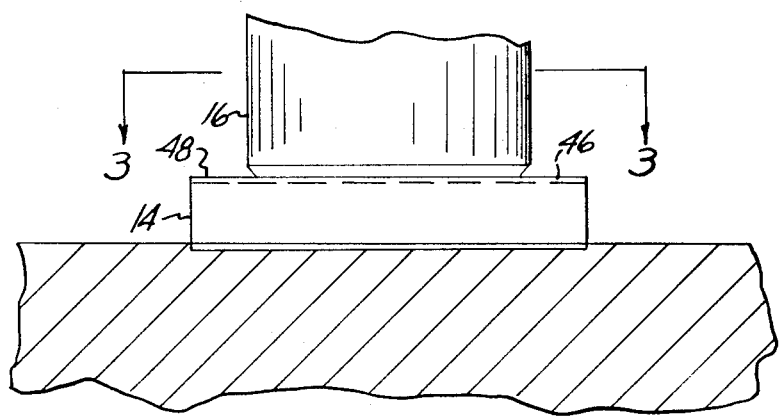
FIG. 2 is an elevational view in partial section of the reading head and master shown in FIG. 1.

Referring to the drawings, and particularly FIG. 1, a reading head assembly 10 is depicted, operatively associated with a column type air flow gage assembly 12, with a master 14 according to the present invention shown in place on the reading head assembly 10.

As the reading head assembly 10 and column type air flow gage assembly 12 are well known in the art only a brief description of these will here be given.

The reading head assembly 10 includes a reading head 16, which has an annular flow chamber 18 (FIG. 3) contained therein, adapted to be supplied with air under pressure from the flow gage assembly 12. The reading head 16 is adapted to be realeased by a linkage 18 so as to rest on the specimen to be tested (or master 14 as the case may be) and the extent of air flow out of the annular flow chamber 18 across lands 20 and 22 provides a measure of the surface roughness of the specimen.

This air is supplied via an air line 24 coupled at one end to the reading head assembly 10 to supply air to an internal passage (not shown) with communicates with the annular flow space 18. The line 24 is coupled at the other end to a common tooling outlet 25 to the three column air flow gages 26, 28, and 30 which make up the flow gaging assembly 12.

The air flow is measured by the position of the particular float 32, 34, or 36 of the particular flow gage which covers the particular range of flow into which the test flow falls, to an extremely accurate degree due to the design of these instruments as is now well understood in the art.

In order to calibrate each instrument as to amplification and float level, the air pressure to each gage 26, 28 and 30 is carefully adjusted to 1½ psi using the manometer 38 associated with the air flow gage assembly 12. The air line 24 is then uncoupled from the reading head assembly connection and connected to one of three connections 40 in the reading head manifold 41 depending on the particular flow gage 26, 28, or 30 to be calibrated.

Each of the connections 40 places the air line in communication with a passage (not shown) containing a "master" orifice and in addition each of the calibration orifices (not shown) contained within each gage 26, 28, 30 themselves, are also connected to provide a calibration circuit used to establish the necessary amplification (using knobs 44) and float level (using knob 45) of each gage. Flow through each master and calibration orifice should be at a predetermined rate at the 1½ psi pressure for its respective gage as indicated by the float, and appropriate amplification and float level adjustments are made in order to obtain this reading of the float when flow is passing through the respective master and calibrating orifice.

The outlet 42 of the particular master orifice is then blocked and the indicated flow through the calibrating orifice along is then adjusted to the lower level.

It can be appreciated from this description why this procedure, as it involves a special calibration circuit which does not use the reading head itself, leads to the disadvantages noted above.

The block type flow master 14 according to the present invention consists of a metal block, of a very stable material such as oil hardened cold stabilized alloy steel preferably A1S18620. Formed in the top thereof is a pair of series of parallel straight line grooves 46 extending at right angles to each other.

These grooves may be formed to be of extremely uniform depth by a form grinding process in which all of the grooves in each series are formed at once by means of crush formed grinding wheel, of the type well known in the art.

After forming the grooves 46, the entire upper surface of the block master 14 is lapped while being checked on a calibrated standard instrument between lapping operations until the groove 46 cross-sectional area is reduced to produce flow of the correct value.

One block master 14 is made for each column type air gage 26, 28, and 30 with the initial grooving such that a greater flow will occur than that for the high reading for the respective gage, so as to be capable of being lapped to produce the proper flow.

In an actual embodiment 12 grooves each way were utilized with 45° sloping sides. For the No. 1 or rough gage these grooves were 0.0038 inches deep, for the No. 2 or medium gage the depth was 0.0018 inches, and the No. 3 or fine gage, the depth was 0.0010 inches.

The number of grooves should be selected so that for the necessary flow the individual grooves are neither too shallow or too deep. If excessively shallow, the uniformity of depth is difficult to achieve and the lapping operation will change the flow therethrough rather rapidly, mading it more difficult to obtain the proper flow.

Making the grooves too deep may cause the penetration of the case hardened layer, which is rather shallow for oil hardened steel, leading to a tendency towards instability of the block. (Tool steel is not sufficiently stable in itself even though the grooves may be cut deeper without penetration of the case hardened layer.)

Figure 3:
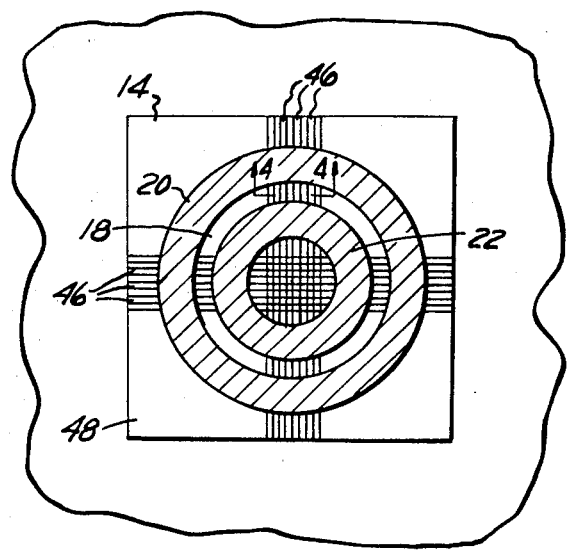
FIG. 3 is a view of the section taken along the line 3—3 in FIG. 2.

Thus, utilizing a configuration wherein different series of grooves at an angle to each other and passing through the center of the block has the advantage of increasing the number of grooves for this purpose, while maintaining all of the grooves transverse and contained within the confines of the annular flow chamber 18, as can be seen in FIG. 3, which as will be explained below, is of great significance in yielding the correct results. In addition, this also yields a groove configuration in which the groove depth is much more easily held to uniformity during forming.

Figure 4:
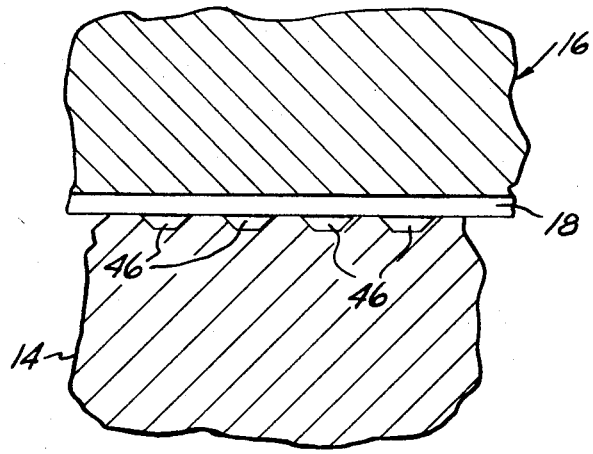
FIG. 4 is a view of the section taken along the line 4—4 of FIG. 3.

Referring to FIGS. 3 and 4, the importance of this groove configuration can be appreciated with respect to the criticality or lack thereof of the position of the annular flow groove 18 with respect to the grooves 46.

Since each of the series of grooves 46 is much narrower than the diameter of the inner land 22, lateral shifting in either direction (within limits) does not open up any more area available to flow and hence variations positioning in either direction will not in the least affect any fluid flow out of the grooves 46 due to picking up more or fewer grooves available for fluid flow.

Since flow is almost entirely controlled by the minimum cross-sectional area available for flow, the transverse positioning of the grooves 46 with respect to the annular flow groove 18 in carrying out the monitoring method provides insensitivity to variations in lateral position which result in different annular flow chamber 18 arc lengths defined by the groove series width. This can be understood from FIG. 4 wherein it can be seen that regardless of the angle of the flow chamber 18 into the drawing, the area defined by the grooves 46 will remain the same and hence the flow will be substantially unaffected.

The symmetry of the annular flow chamber 18 and the above-described groove series characteristics also prevents variations in flow occurring because of variations in angular position.

In use, the instruments are calibrated in the normal fashion, and from time to time, the three block type flow masters for each gage 26, 28, and 30 are inserted one at a time under the reading heads in the general position shown in FIG. 3 to quickly obtain an extremely accurate check on the accuracy of the instrument.

If the proper readings are not obtained, a check of the calibration of the instrument is made, and if it may be calibrated to obtain the proper spread of high and low values, this will indicate reading head problems, while if such spread is not obtainable, dirty or worn master orifices are indicated.

While the instrument could be calibrated by use of the masters themselves, their relative expense and wear problems indicates that their use as a monitoring device only as described is advisable.

Thus, it can be seen that a rapid, accurate, and inherently reliable check on the performance of these gages is obtained, without involving excessively expensive masters by use of this method and block master.

What is claimed is:

1. A flow master in combination with a surface characteristic measuring instrument of the type wherein a reading head having a flow chamber and an opening therein is adapted to be placed with the flow chamber opening against the surface and also includes means for supply and measuring fluid flow through said flow chamber when the surface is in position against said surface, the flow master comprising an element having a surface adapted to be placed against said opening, said surface having two series of uniform depth grooves extending thereacross transversely to each other and occupying a portion of said surface, each of said two groove series widths being less than said flow chamber opening but each of said groove series lengths being greater than said flow chamber opening, whereby flow out of said opening through said grooves is unaffected by limited changes in position of said chamber opening with respect to said surface.

2. The flow master of claim 1 wherein each of said two groove series lengths extends entirely across said element surface.

3. The flow master of claim 1 wherein the cross-sectional area of said two groove series is such that flow therethrough out of said chamber opening is the same as that occurring with a paper specimen of a particular surface roughness.

4. The flow master of claim 1 wherein said grooves are straight and parallel and entirely extend across said element surface.

* * * * *